(12) United States Patent
Hung

(10) Patent No.: US 11,105,462 B2
(45) Date of Patent: Aug. 31, 2021

(54) EXTENSION ARM SUPPORT DEVICE

(71) Applicant: MODERNSOLID INDUSTRIAL CO., LTD., Taichung (TW)

(72) Inventor: Chin-Jui Hung, Taichung (TW)

(73) Assignee: Modernsolid Industrial Co., LTD., Taichung (TW)

( * ) Notice: Subject to any disclaimer, the term of this patent is extended or adjusted under 35 U.S.C. 154(b) by 0 days.

(21) Appl. No.: 16/879,148

(22) Filed: May 20, 2020

(65) Prior Publication Data

US 2020/0386367 A1    Dec. 10, 2020

(30) Foreign Application Priority Data

Jun. 6, 2019    (TW) .................................. 108119703

(51) Int. Cl.
*F16M 13/02*    (2006.01)

(52) U.S. Cl.
CPC ..... *F16M 13/022* (2013.01); *F16M 2200/021* (2013.01); *F16M 2200/06* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,876,075 B2* | 11/2014 | Diez | ................ | F16M 11/2014 |
| | | | | 248/324 |
| 10,054,260 B2* | 8/2018 | Hung | ................ | F16M 11/28 |
| 10,452,096 B1* | 10/2019 | Keilers | ................ | G06F 1/16 |
| 10,520,131 B2* | 12/2019 | Burke | ................ | F16M 11/045 |
| 10,888,392 B2* | 1/2021 | Oginski | ................ | F16M 13/027 |
| 2012/0025037 A1 | 2/2012 | Chang | | |
| 2018/0080601 A1* | 3/2018 | Bosnakovic | ................ | F16M 11/08 |

FOREIGN PATENT DOCUMENTS

| | | |
|---|---|---|
| CN | 208237399 | 12/2018 |
| TW | M583563 | 9/2019 |

OTHER PUBLICATIONS

Search Report appended to an Office Action, which was issued to Taiwanese counterpart application No. 108119703 by the TIPO dated Sep. 12, 2019, with an English translation thereof.

* cited by examiner

*Primary Examiner* — Monica E Millner

(57) ABSTRACT

An extension arm support device includes an upright post, and an adaptor module having a surrounding wall which surrounds the upright post, and a plurality of anchored portions disposed on the surrounding wall. Each anchored portion has at least one axially extending anchored rail. At least one extension arm has an anchoring portion facing the anchored portions, and having at least one anchoring member which is slidable along and engaged with the anchored rail in the axial direction such that the extension arm is removably connected to the adaptor module for adjusting the angular position of the extension arm relative to the upright post.

10 Claims, 23 Drawing Sheets

EXTENSION ARM SUPPORT DEVICE

CROSS-REFERENCE TO RELATED APPLICATION

This application claims priority of Taiwanese Patent Application No. 108119703, filed on Jun. 6, 2019.

FIELD

The disclosure relates to an extension arm support device, and more particularly to an extension arm support device having at least one arm removably connected with an upright post to adjust an angular position of the arm.

BACKGROUND

Referring to FIG. 1, a conventional extension arm support device 1 for suspending a display device includes an upright post 11, an adaptor 12 releasably retained on the upright post 11, and two suspending arms 13 pivotably connected to ends of the adaptor 12 for mounting display devices 14 (only one of which is shown) at distal ends thereof. Through the turning of the suspending arms 13 relative to the adaptor 12 and through the turning of the adaptor 12 relative to the upright post 11, an angular position of each display device 14 can be adjusted. Since the adaptor 12 bears the whole weight of the display devices 14 and the suspending arms 13 and needs to be retained on the upright post 11 with a large friction, the user must take much effort to release the adaptor 12 from the upright post 11 for adjusting the angular position of the suspending arms 13, which results in inconvenience during usage.

SUMMARY

Therefore, an object of the disclosure is to provide an extension arm support device that can alleviate at least one of the drawbacks of the prior art.

According to the disclosure, an extension arm support device includes a support unit, an adapting unit and an extension arm unit. The support unit includes an upright post which extends along an axis. The adapting unit includes an adaptor module which is sleeved around the upright post. The adaptor module has a surrounding wall which surrounds the upright post, and a plurality of anchored portions which are disposed on the surrounding wall and angularly displaced from each other about the axis. Each of the anchored portions has at least one anchored rail which extends in an axial direction parallel to the axis. The extension arm unit includes at least one extension arm which extends in a lengthwise direction radial to the axis to terminate at an anchoring portion. The anchoring portion has an end wall which faces the anchored portions, and at least one anchoring member which is disposed on the end wall and which is slidable along and engaged with the anchored rail in the axial direction such that the extension arm is removably connected to the adaptor module.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
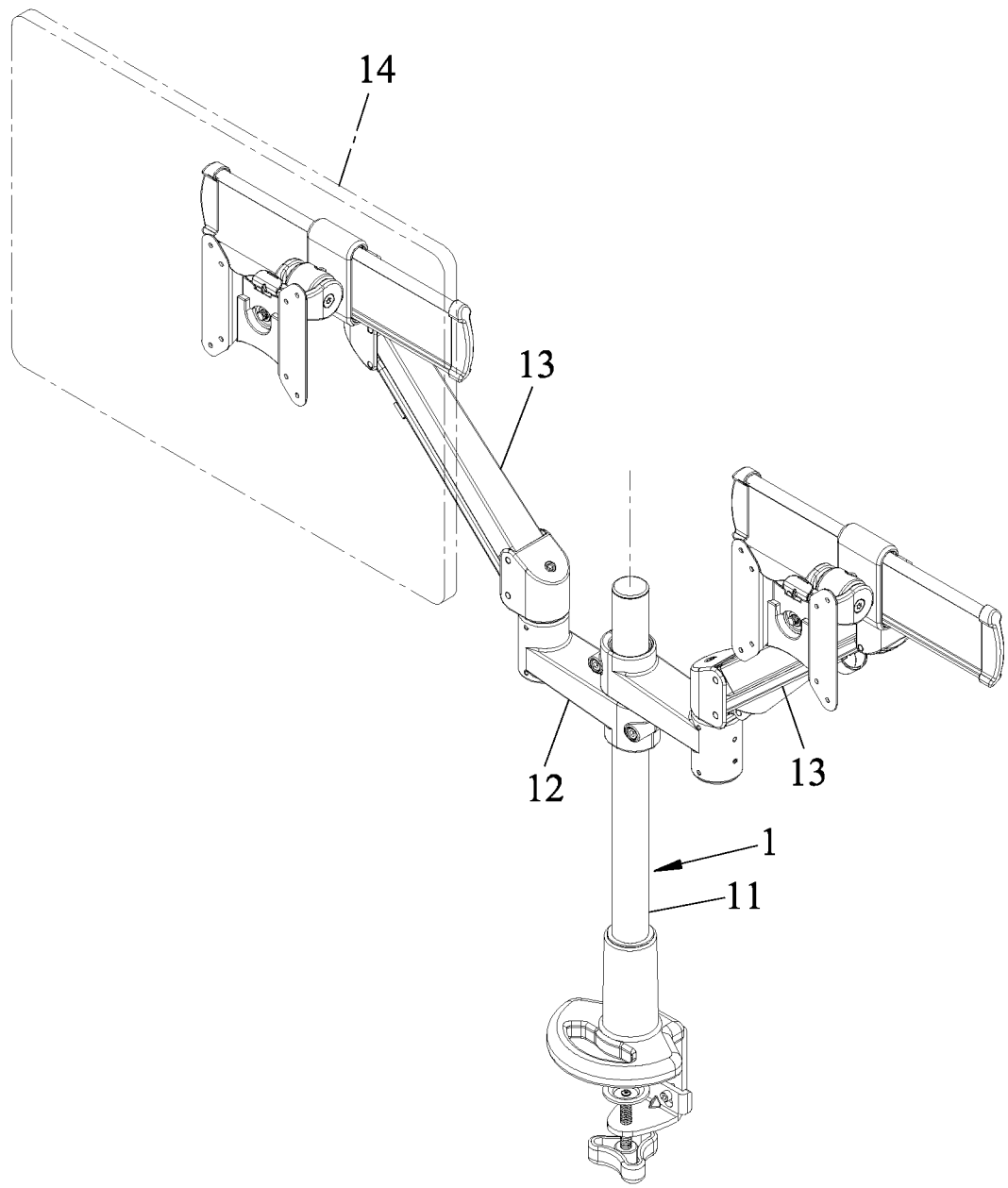
FIG. 1 is a perspective view of a conventional extension arm support device.
Figure 2:
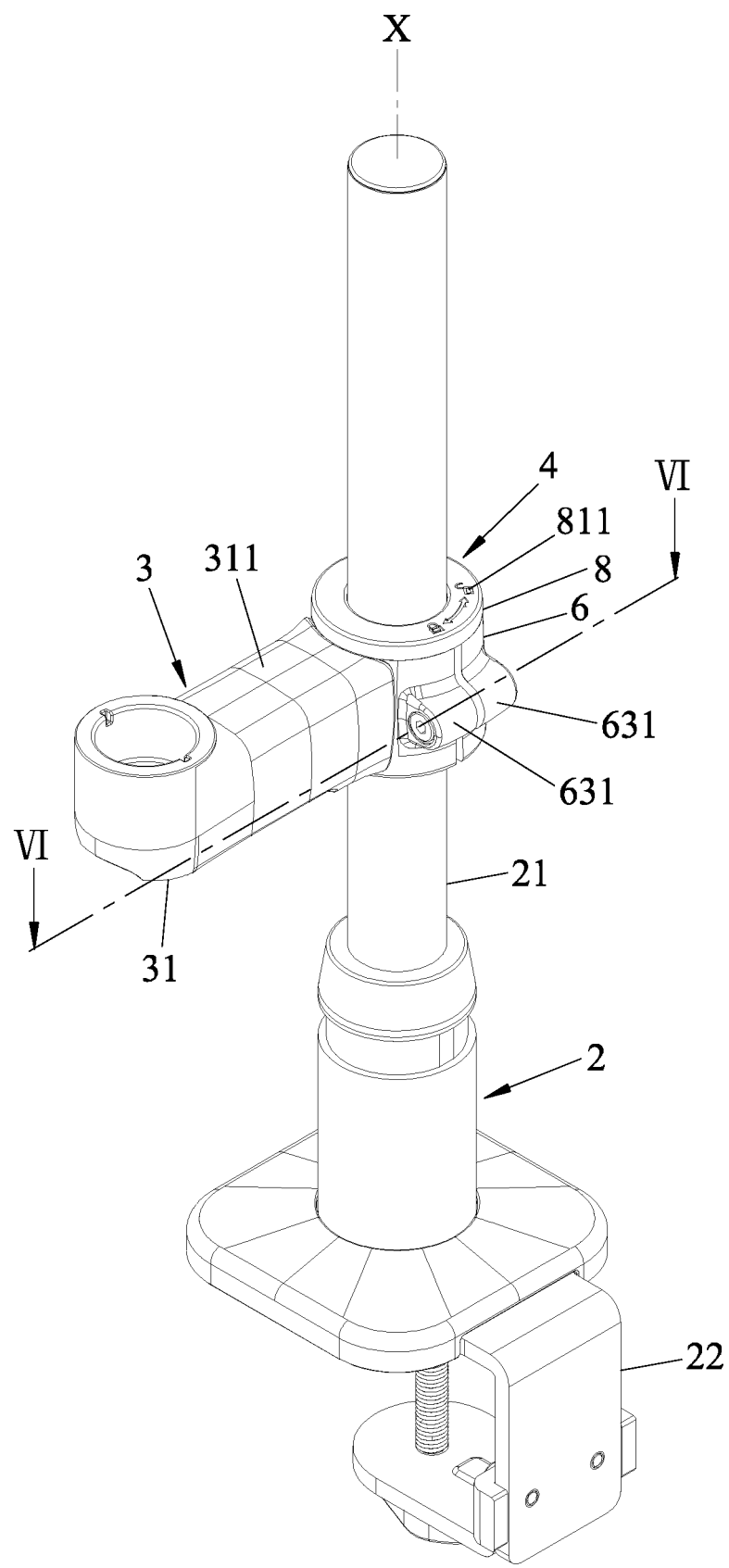
FIG. 2 is a perspective view illustrating an embodiment of an extension arm support device according to the disclosure.
Figure 3:
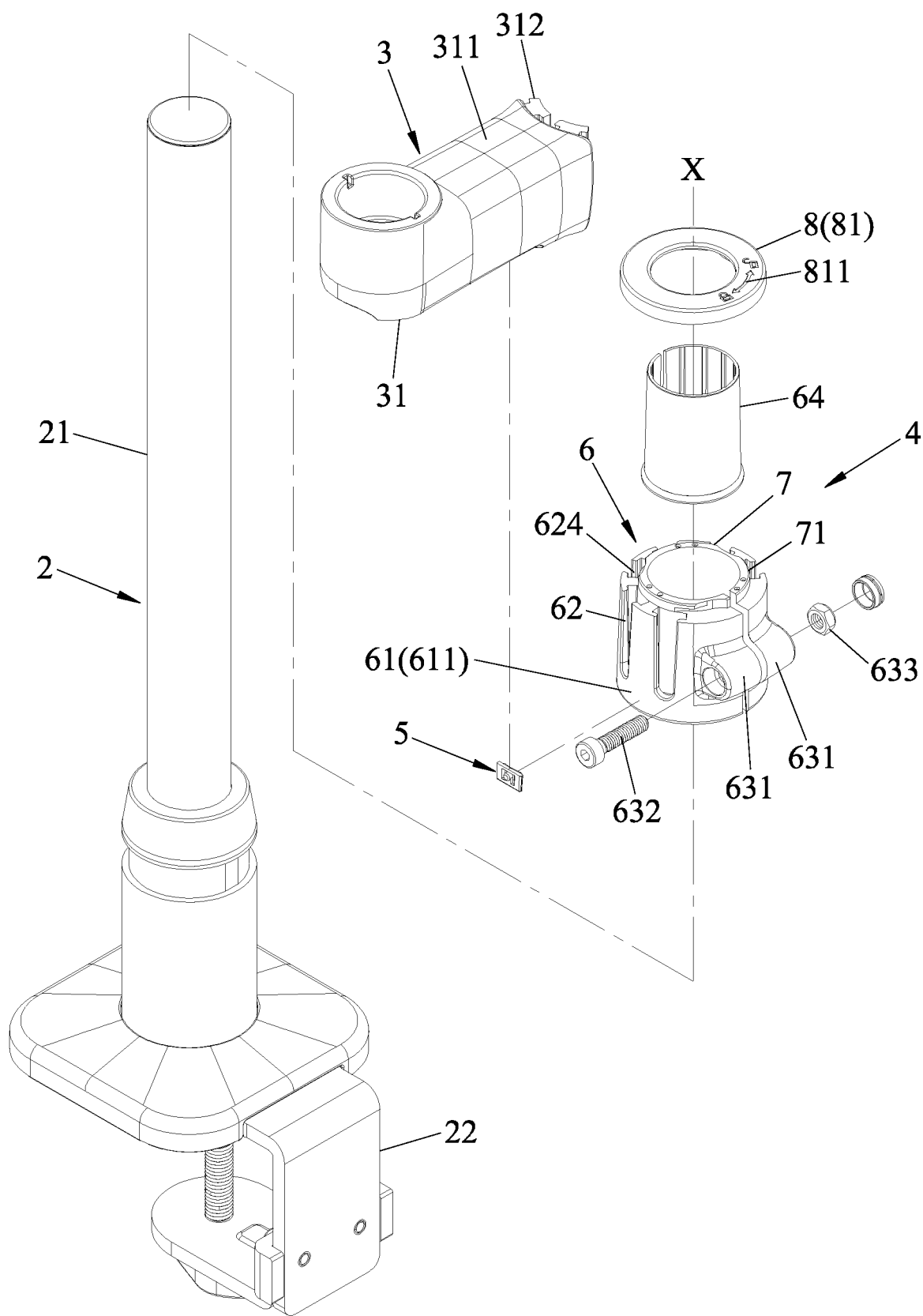
FIG. 3 is an exploded perspective view of FIG. 2.

Referring to FIGS. 2 and 3, an embodiment of an extension arm support device according to the disclosure includes a support unit 2, an extension arm unit 3, an adapting unit 4 and an elastomeric retaining enhancing member 5.

Figure 4:
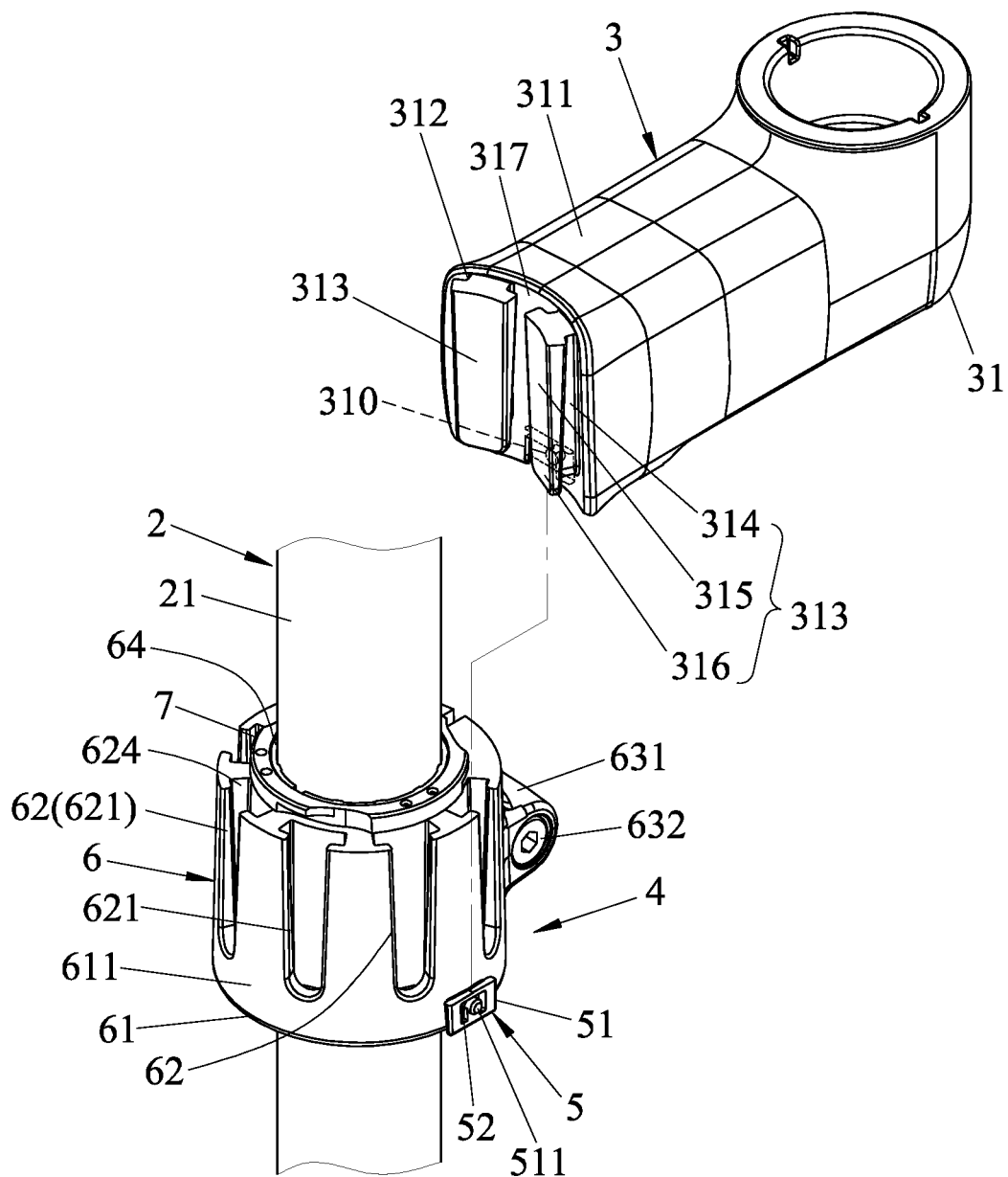
FIG. 4 is a fragmentary, exploded perspective view of the embodiment.
Figure 5:
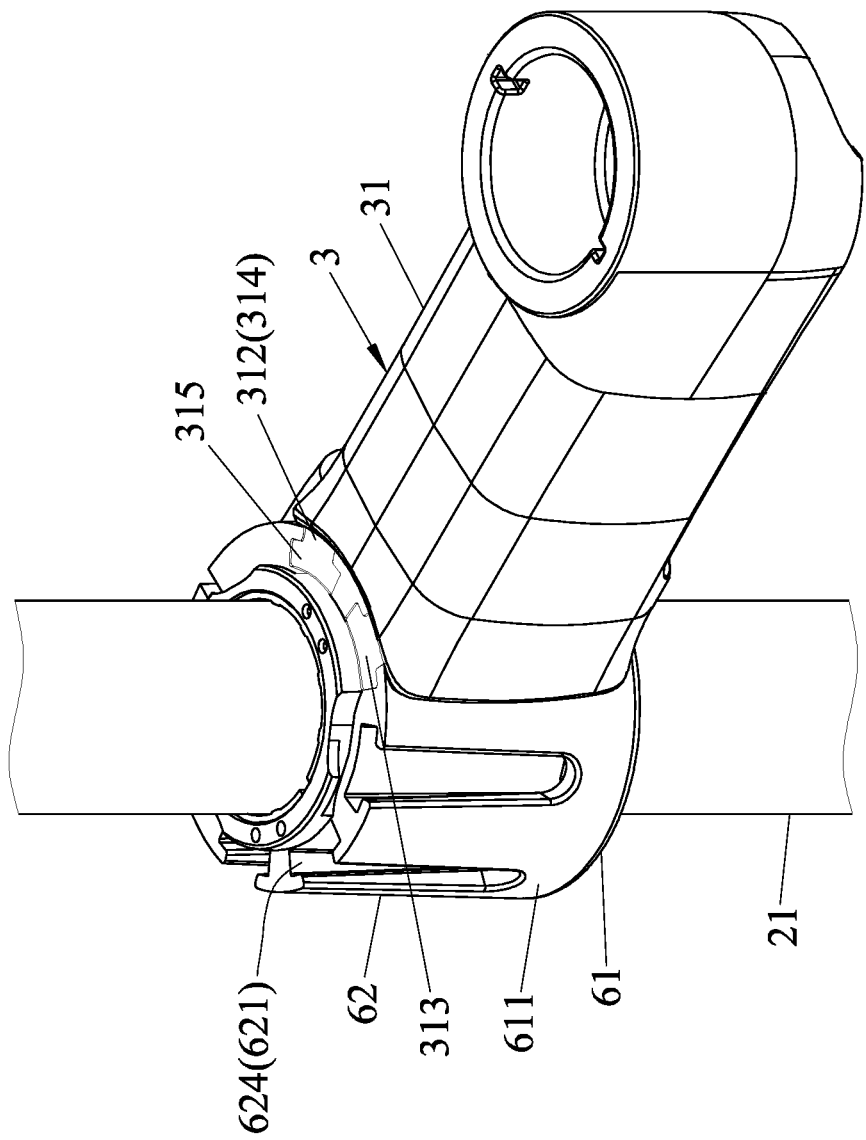
FIG. 5 is a perspective view of FIG. 4.

The support unit 2 includes a base seat 22 and an upright post 21 which extends from the base seat 22 along an axis (X). With reference to FIGS. 4 and 5, the extension arm unit 3 includes at least one extension arm 31. The extension arm 31 is made of a metal material, and has an arm body 311 extending in a lengthwise direction radial to the axis (X) to terminate at an anchoring portion 312. The anchoring portion 312 has an end wall 317 which faces the upright post 21, and an abutment hole 310 formed in the end wall 317. In this embodiment, the anchoring portion 312 has two anchoring members 313 disposed on the end wall 317 and spaced apart from each other. Each of the anchoring members 313 is in the form of a protrusion which projects from the end wall 317, and has a neck portion 314 extending from the end wall 317, a head portion 315 extending from the neck portion 314, and a lower retaining portion 316 extending downwardly from the head portion 315 and below the neck portion 314.

Referring to FIGS. 3 to 5, the adapting unit 4 includes an adaptor module 6 which has a surrounding wall 61 sleeved around the upright post 21, a cover positioning wall 7 which is disposed inwardly and radially of the surrounding wall 61 to surround the upright post 21 and which projects upwardly from the surrounding wall 61, and a surrounding cover 8 which is sleeved around the upright post 21 to be mounted on the cover positioning wall 7 and the surrounding wall 61. In this embodiment, the surrounding wall 61 is of a C-shape, and extends circumferentially to terminate at two edges. The surrounding wall 61 has two lugs 631 which are respectively formed adjacent to the edges, and a quick-release fastener 632, 633 which extends through the lugs 631 to tighten the lugs 631 close to each other so as to retain firmly the adaptor module 6 on the upright post 21. The quick-release fastener 632, 633 includes a screw bolt 632 extending through the lugs 631, and a screw nut 633 threadedly engaged with the screw bolt 632, as shown in FIG. 6.

Figure 6:
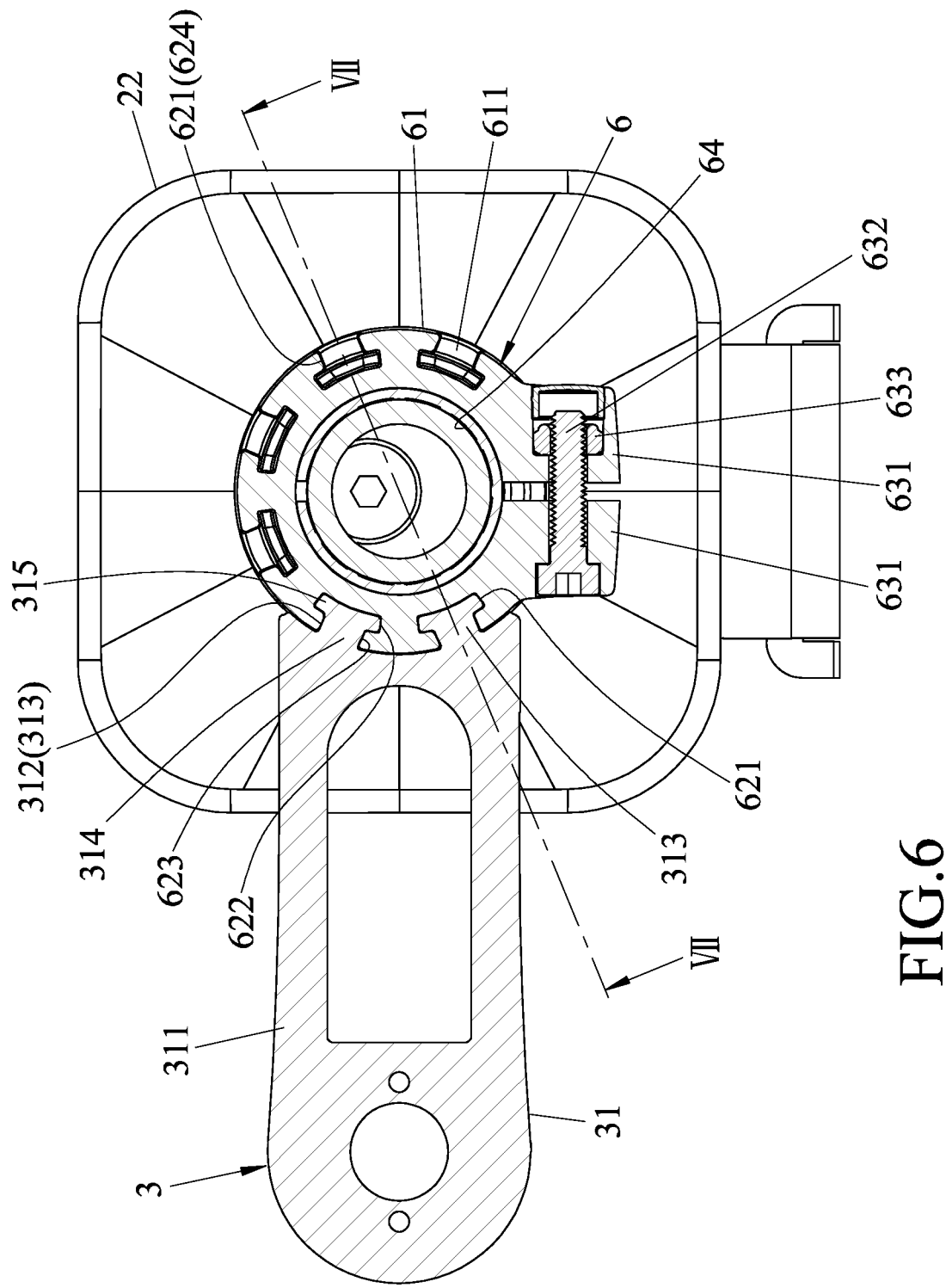
FIG. 6 is a sectional view taken along line VI-VI of FIG. 2.
Figure 7:
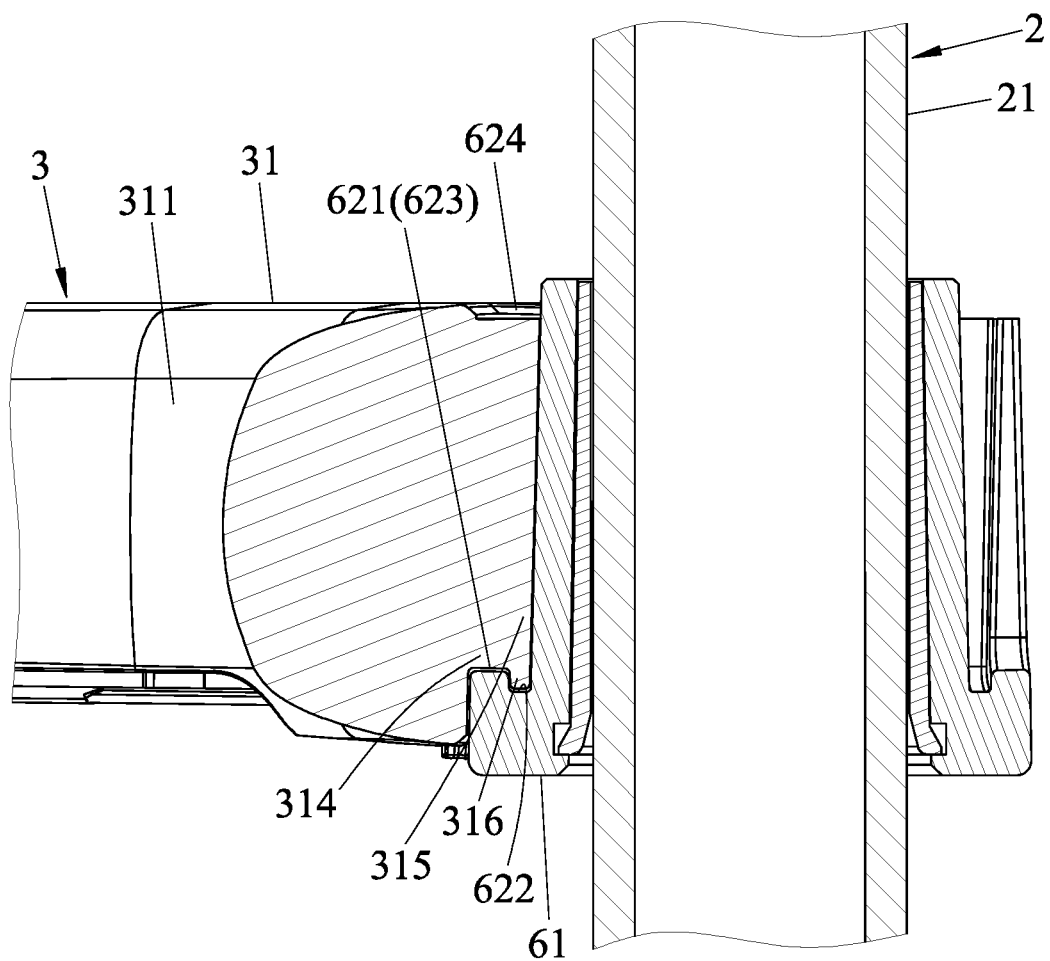
FIG. 7 is a sectional view taken along line VII-VII of FIG. 6.
Figure 8:
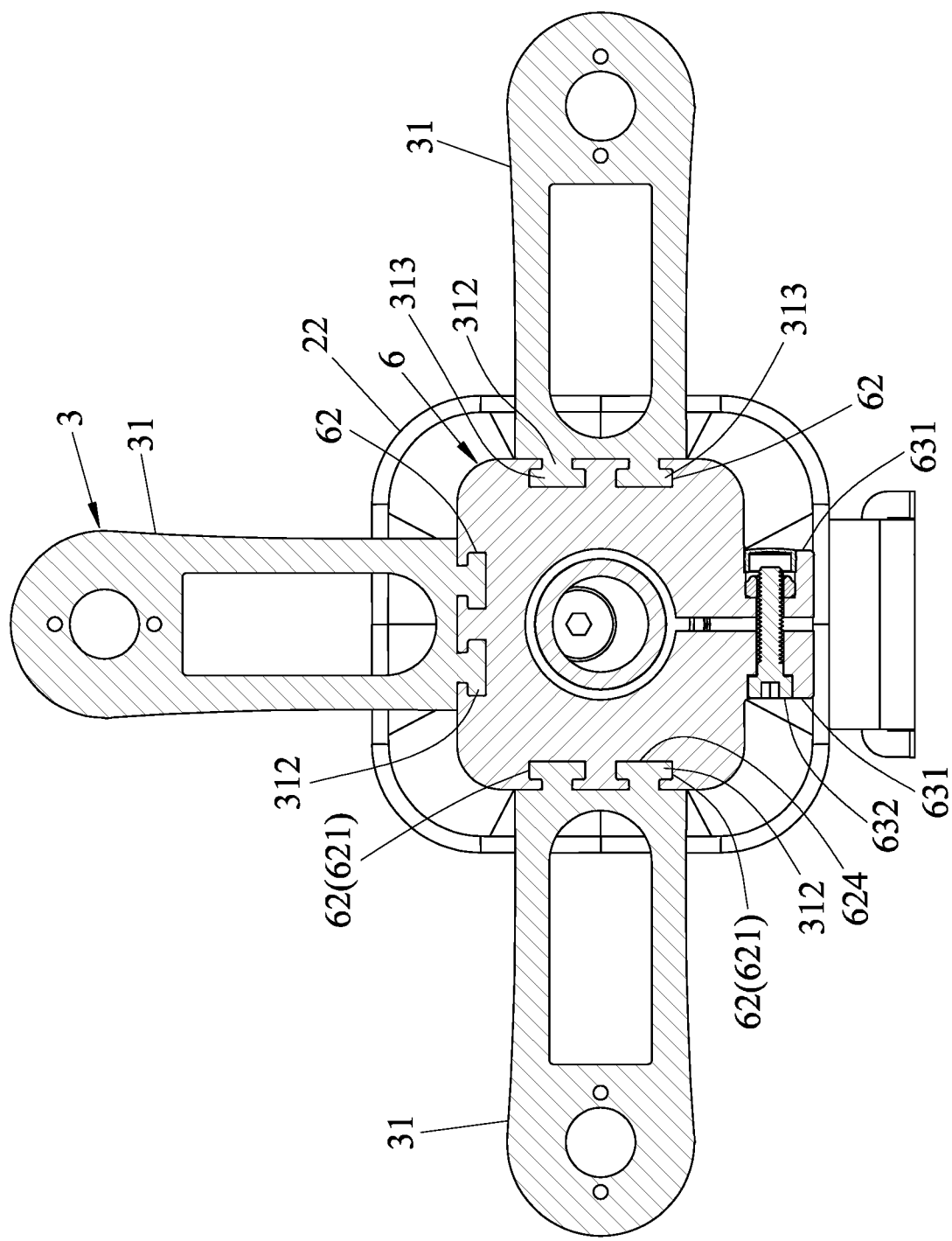
FIGS. 8 to 14 are sectional views taken from an angle similar to FIG. 6, illustrating an adaptor module of an adapting unit in modified forms.
Figure 9:
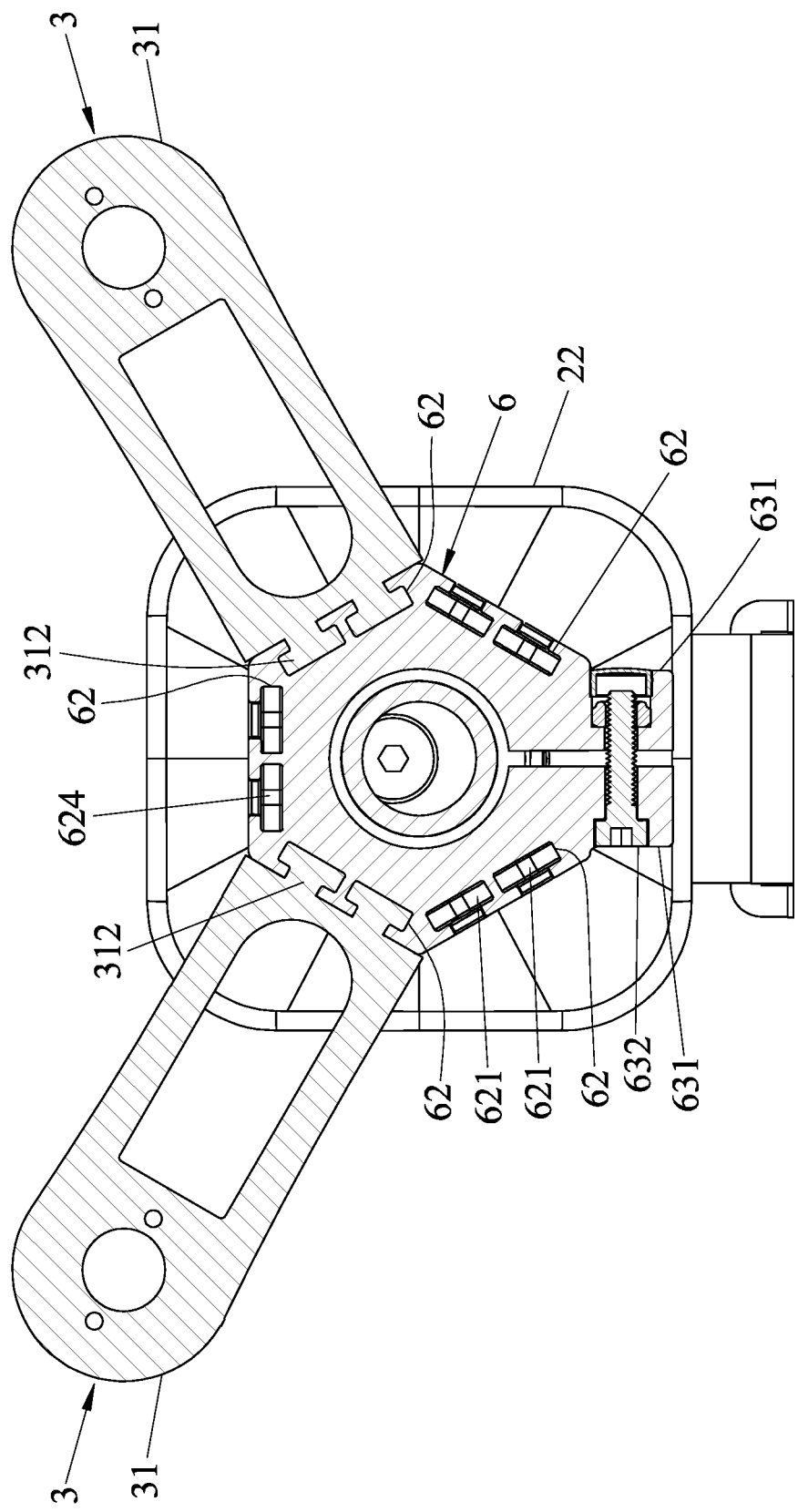
Figure 10:
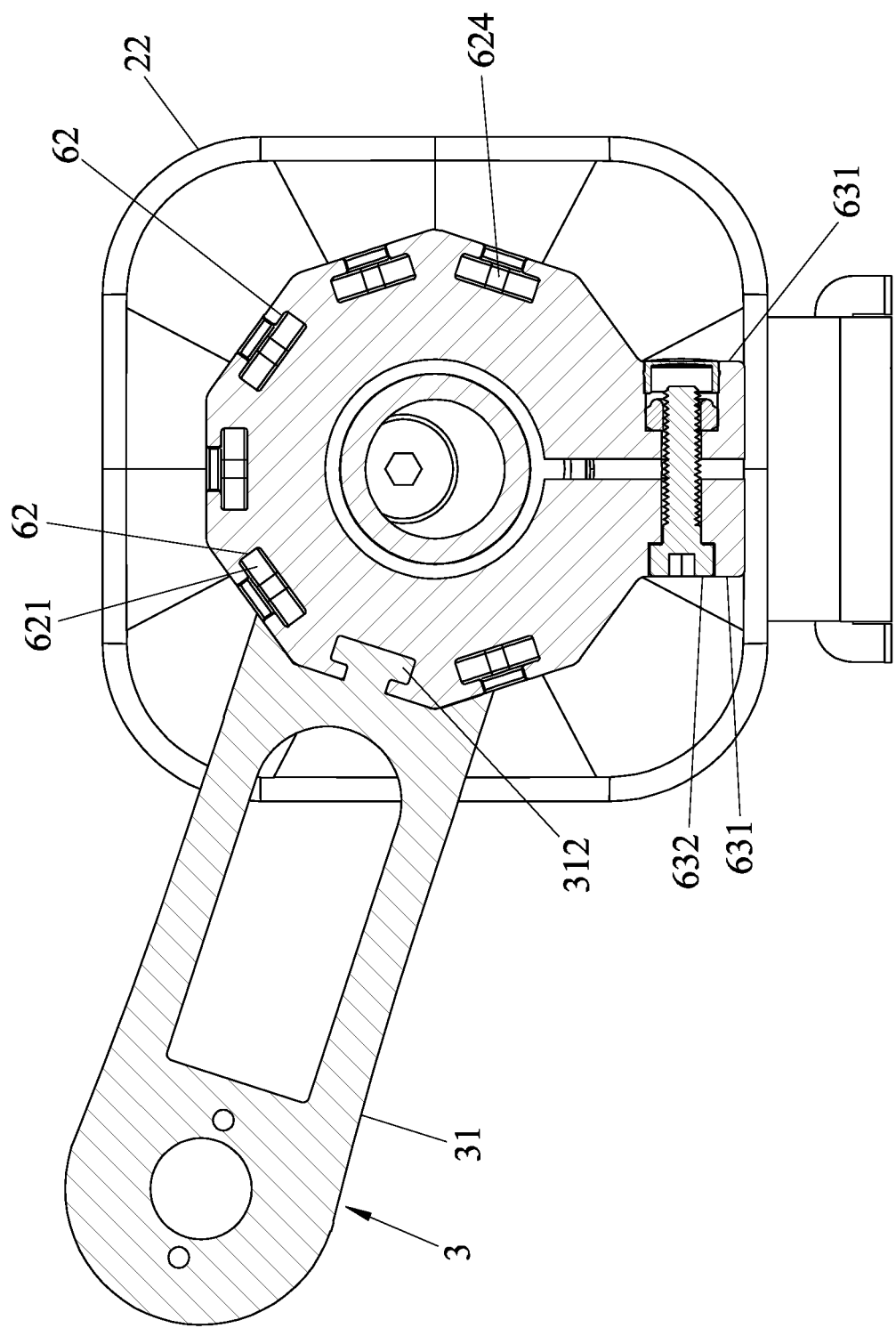
Figure 11:
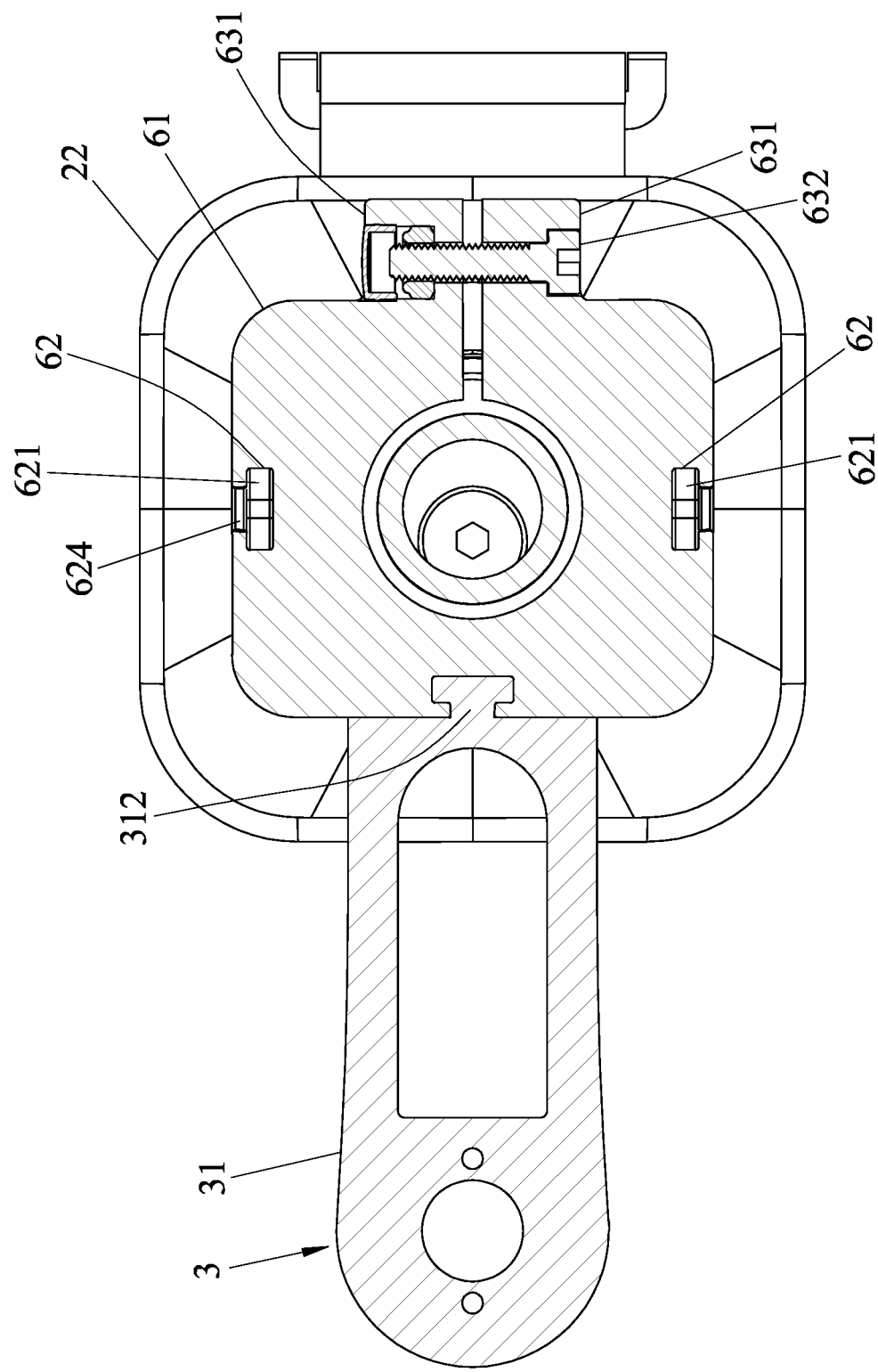
Figure 12:
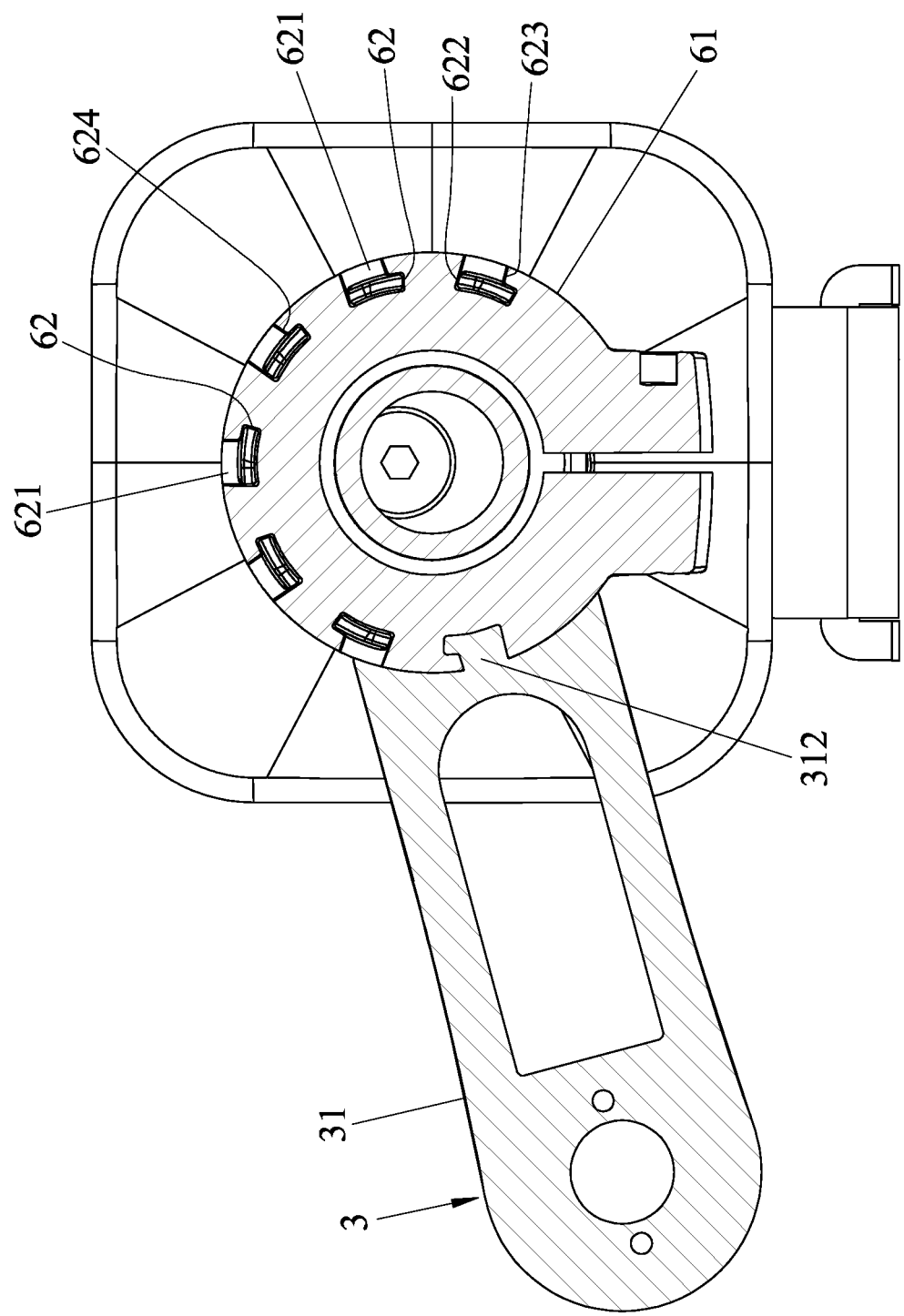
Figure 13:
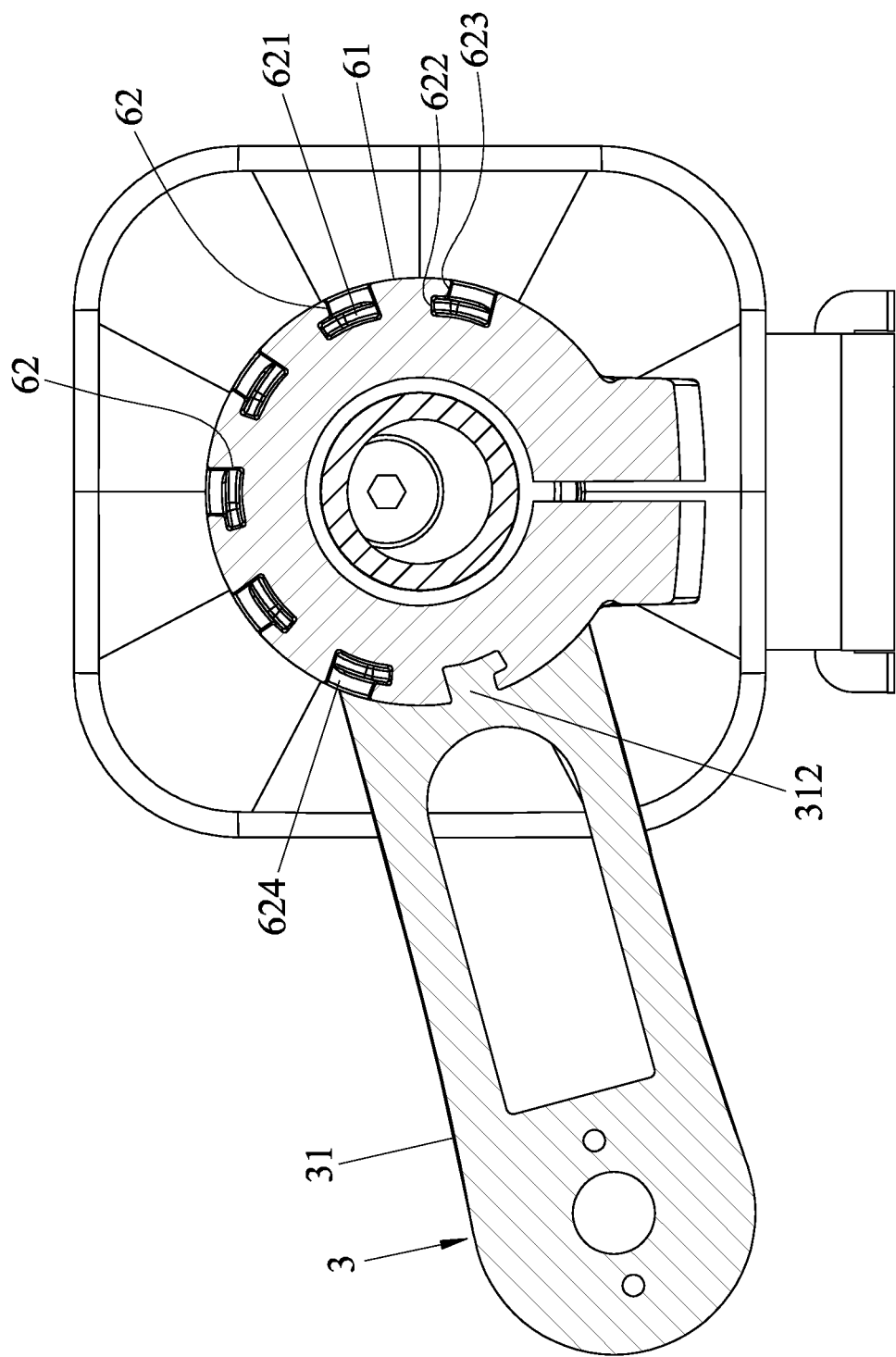
Figure 14:
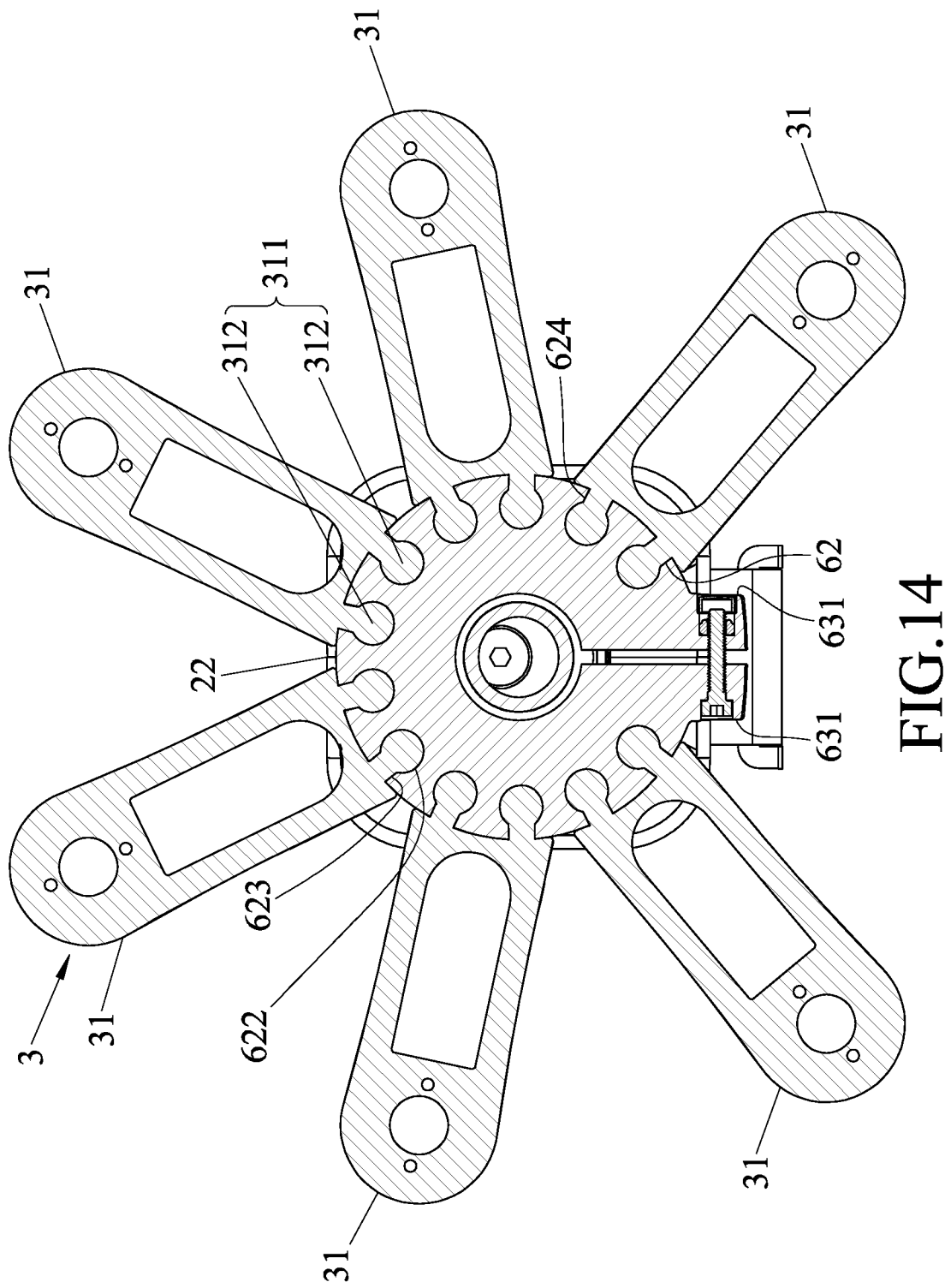

With reference to FIGS. 4, 6 and 7, the adaptor module 6 has three anchored portions 62 which are disposed on the surrounding wall 61 and angularly displaced from each other about the axis (X). Each of the anchored portions 62 has two anchored rails 621 which extend from an outer surrounding surface 611 of the surrounding wall 61 in an axial direction parallel to the axis (X). In this embodiment, each anchored rail 621 is in the form of a groove which is formed in the surrounding wall 61. In an alternative embodiment, each anchored rail may be in the form of a protrusion while each anchoring member may be in the form of a groove. Referring to FIGS. 5 to 7, each anchored rail 621 has a larger width groove portion 622 which is formed proximate to the axis (X) for receiving the head portion 315 of the corresponding anchoring member 313, and a smaller width groove portion 623 which is formed distal from the axis (X) and in spatial communication with the larger width groove portion 622 for receiving the neck portion 314 of the corresponding anchoring member 313. The anchored rail 621 extends in the axial direction to terminate at an upper opening 624 which is in spatial communication with the larger and smaller width groove portions 622, 623 for insertion and removal of the corresponding anchoring member 313 into and from the anchored rail 621.

In this embodiment, the anchoring member 313 is slidably inserted into the corresponding anchored rail 621 in the axial direction to have an upper surface immerged in the anchored rail 621. With the anchored rail 621 having the larger and smaller width groove portions 622, 623 for respectively receiving the head and neck portions 315, 314, the anchoring member 313 is slidably inserted in the anchored rail 621 in the axial direction and is restricted from radial movement relative to the axis (X). Moreover, the smaller width groove portion 623 has, in the axial direction, a length which is smaller than that of the larger width groove portion 622. Therefore, the radial movement of the anchoring member 313 can be further prevented.

In this embodiment, the upper opening 624 has a T-shaped cross-section such that the anchoring member 313 has a T-shaped cross-section.

Alternatively, in alternative modified forms, the numbers of the surrounding wall 61, of the anchored portions 62, and of the anchored rails 621 of each anchored portion 62, and the shape of cross-section of the upper opening 624 may be those illustrated in the following list and FIGS. 8 to 14.

| FIGS. | Cross-section of Surrounding Wall 61 | Number of Anchored Portions 62 | Number of Anchored Rail 621 | Cross-section of Upper Opening 624 |
|---|---|---|---|---|
| 8 | quadrilateral | 3 | 2 | same as present embodiment |
| 9 | hexagon | 5 | 2 | same as present embodiment |
| 10 | decagon | 7 | 1 | same as present embodiment |
| 11 | quadrilateral | 3 | 1 | same as present embodiment |
| 12 | round | 7 | 1 | second modified form |
| 13 | round | 7 | 1 | first modified form |
| 14 | round | 6 | 2 | third modified form |

First modified form: the upper opening 624 has an L-shaped cross-section.
Second modified form: the upper opening 624 has a back-to-back L-shaped cross-section in mirror symmetry.
Third modified form: the larger width groove portion 622 is rounded, and a diameter of the larger width groove portion 622 is larger than a width of the smaller width groove portion 623.

Figure 15:
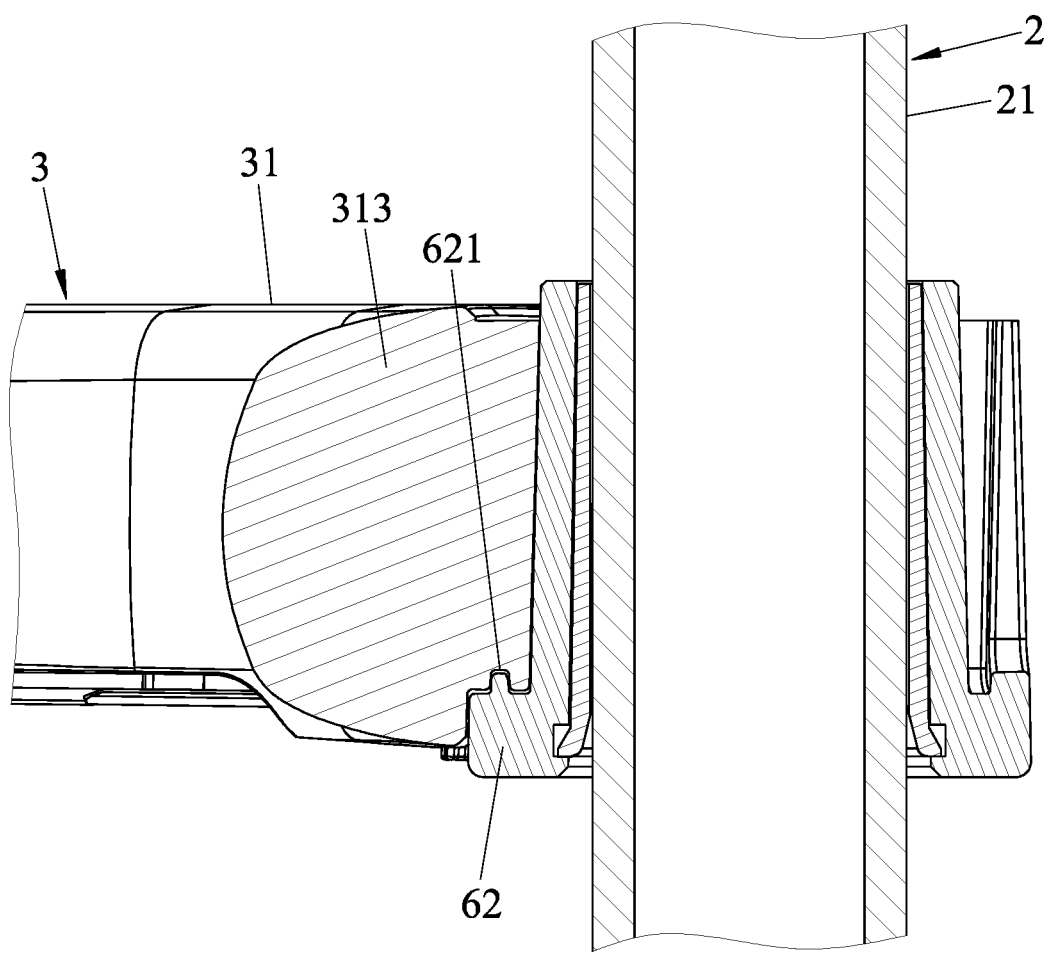
FIGS. 15 to 17 are sectional views taken from an angle similar to FIG. 7, illustrating an anchored rail and an anchoring member in modified forms.
Figure 16:
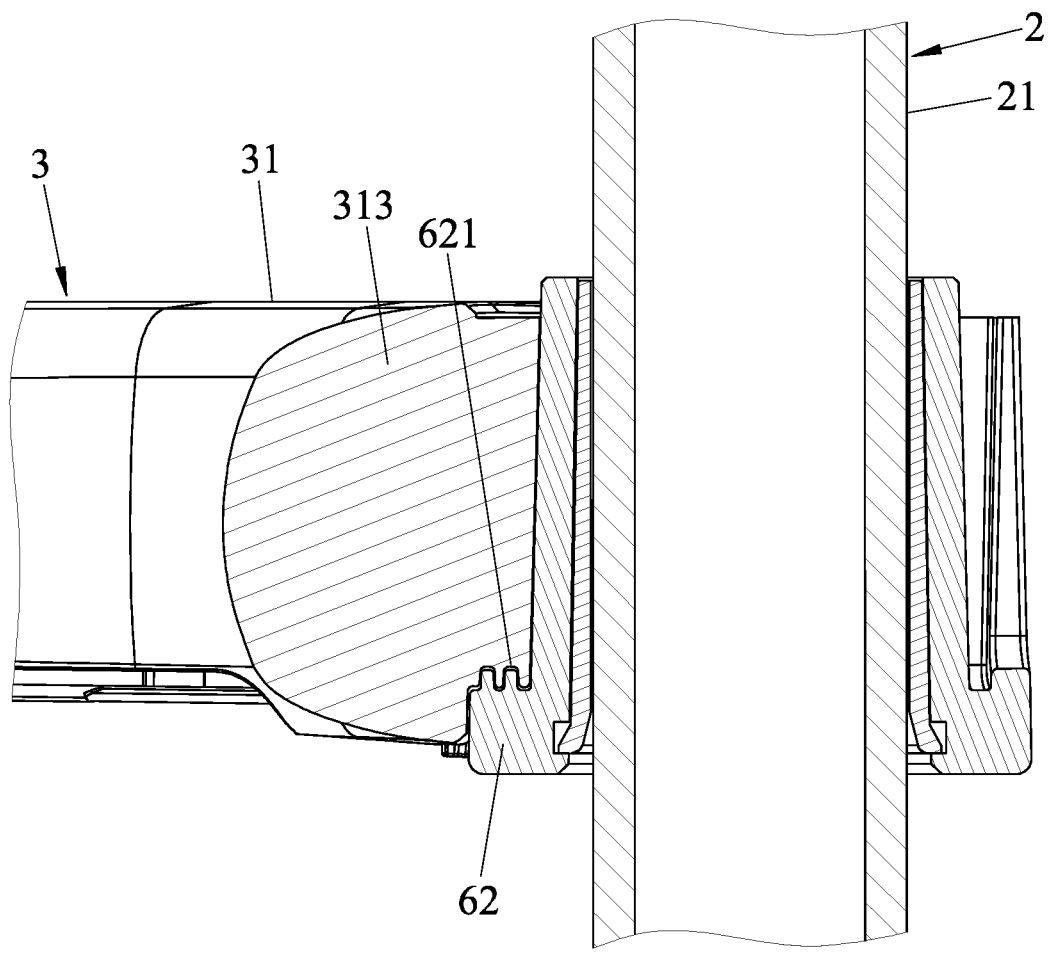
Figure 17:
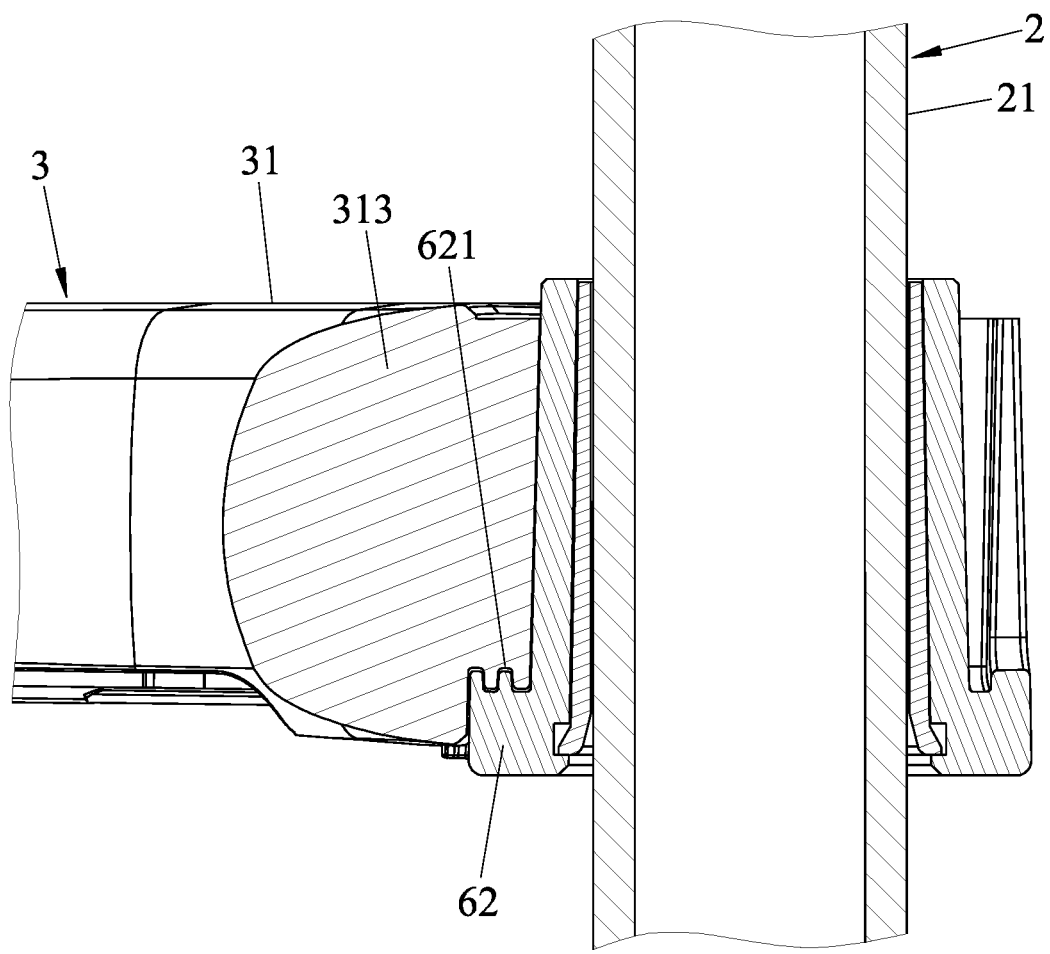

Moreover, the upper opening 624 may alternatively have a V-shaped cross-section. In other modified embodiments, as shown in FIGS. 15 to 17, the anchored rails 621 of the adaptor module 6 and the corresponding anchoring members 313 of the extension arm 31 may have a variety of configurations.

Referring again to FIGS. 3 and 6, the adaptor unit 4 further includes a collar 64 which is interposed between the surrounding wall 61 and the upright post 21 to increase friction therebetween so as to prevent axial movement and rotation of the surrounding wall 61 relative to the upright post 21.

Figure 18:
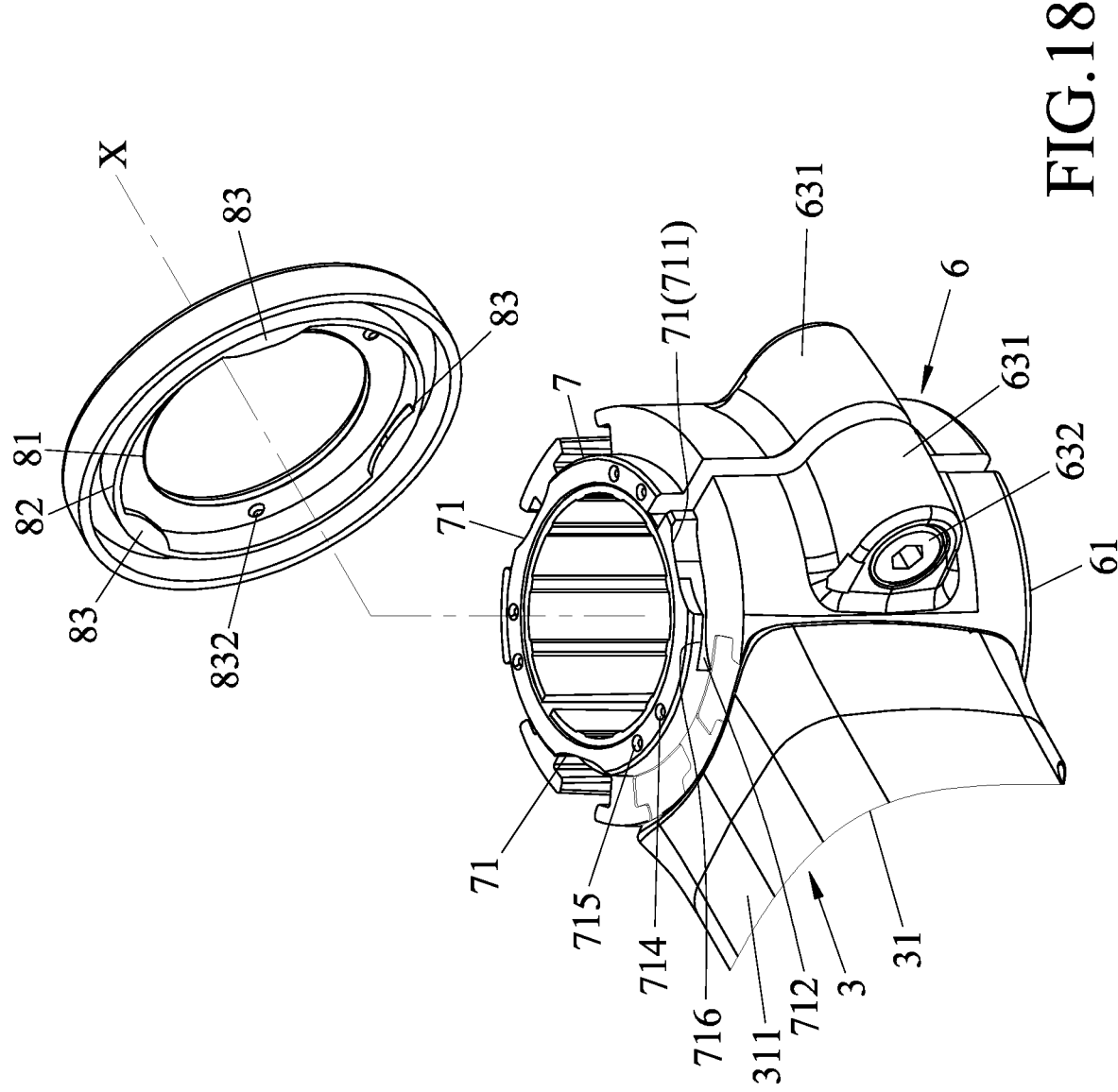
FIG. 18 is a fragmentary, exploded perspective view of the embodiment.
Figure 19:
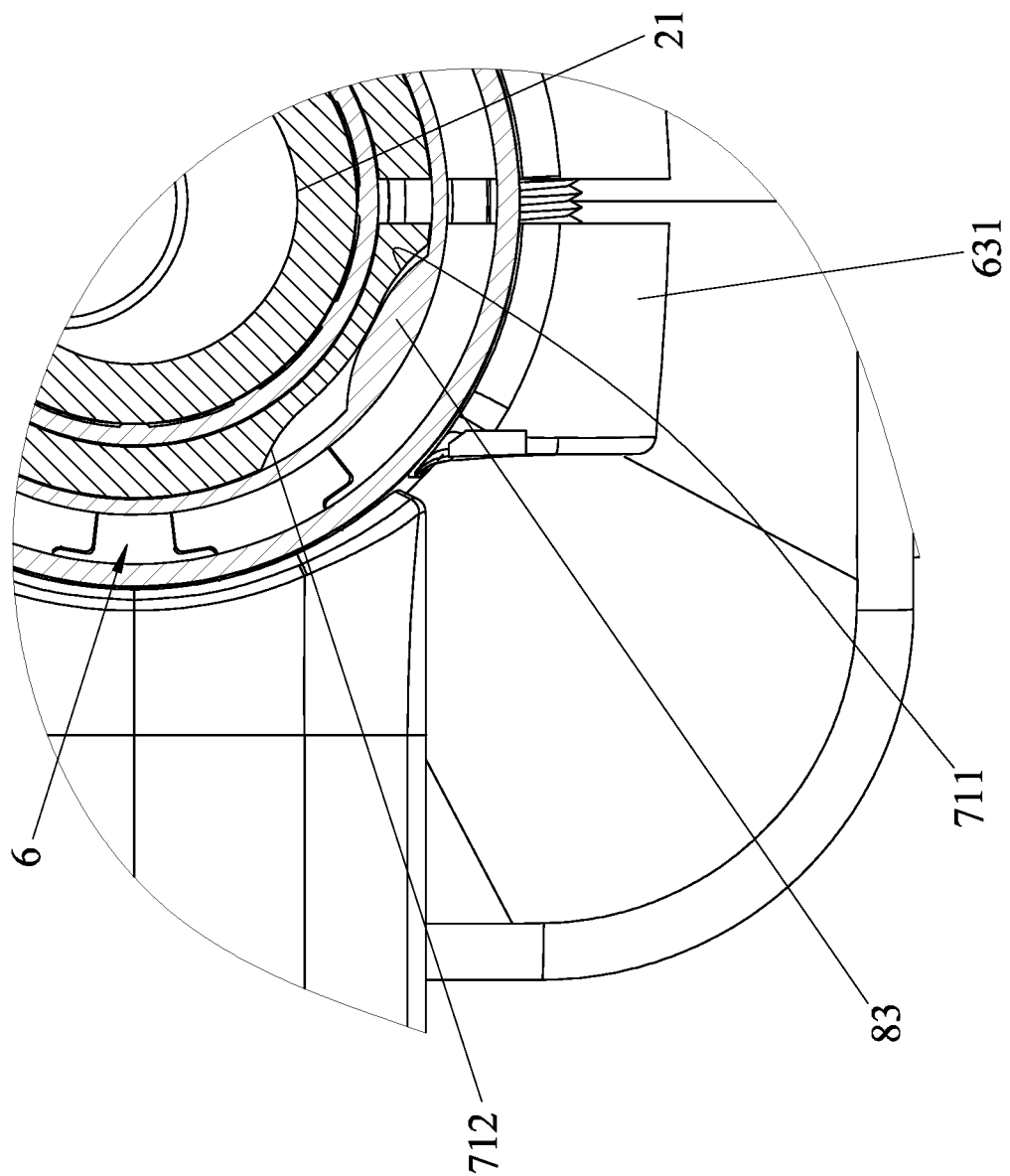
FIGS. 19 and 20 are fragmentary sectional views illustrating a surrounding cover in an unlocking position.
Figure 20:
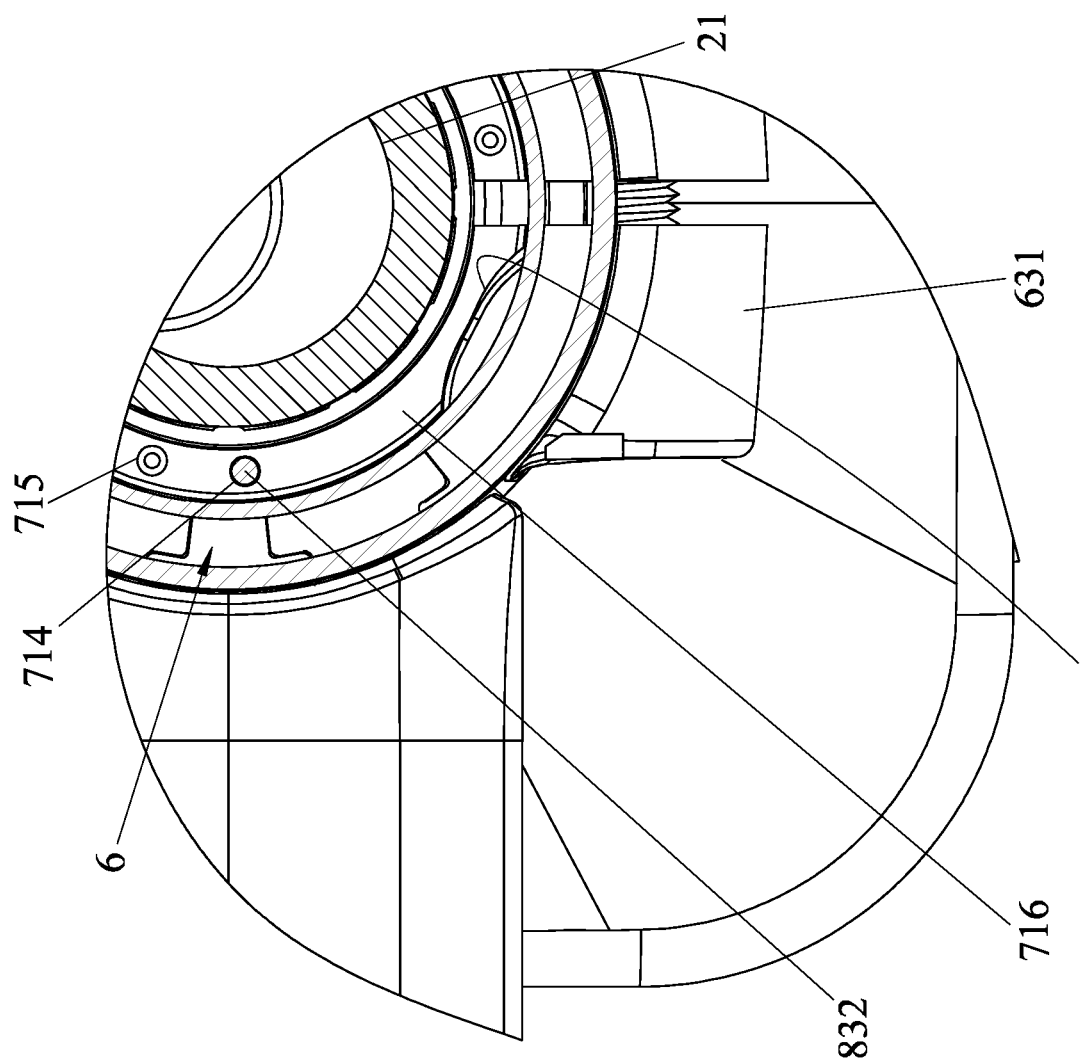

Referring to FIGS. 18 to 20, the cover positioning wall 7 has three retaining slots 71 which are formed in an outer surface thereof and angularly displaced from one another about the axis (X). Each retaining slot 71 extends circumferentially to have leading and trailing slot segments 711, 712 which are angularly displaced from each other, and a retaining wall 716 which is formed above the trailing slot segment 712. The cover positioning wall 7 further has three first positioning holes 714 and three second positioning holes 715 which are formed in an upper end surface thereof and angularly displaced from one another about the axis (X). The surrounding cover 8 is disposed to cover the anchored rails 621 of the anchored portions 62, and has an annular upper wall portion 81, a surrounding wall portion 82 extending downwardly from a periphery of the upper wall portion 81, and three retaining protrusions 83 formed on the surrounding wall portion 82. As shown in FIG. 2, an indicative mark 811 is formed on the upper wall portion 81. Each retaining protrusion 83 projects radially and inwardly toward the axis (X). The surrounding cover 8 further has three positioned studs 832 which project from a lower end surface of the upper wall portion 81.

Figure 21:
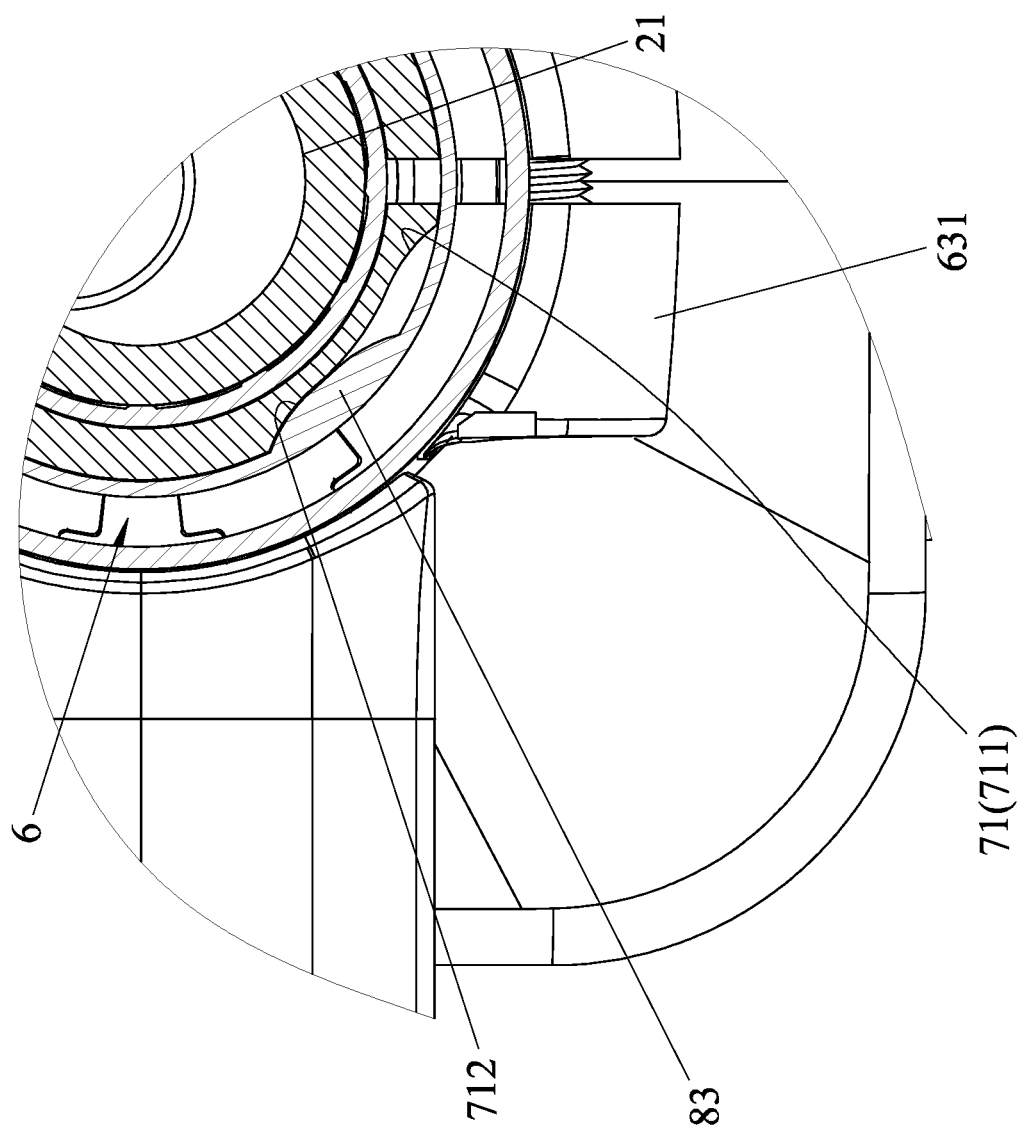
FIGS. 21 and 22 are fragmentary sectional views illustrating the surrounding cover in a locking position.
Figure 22:
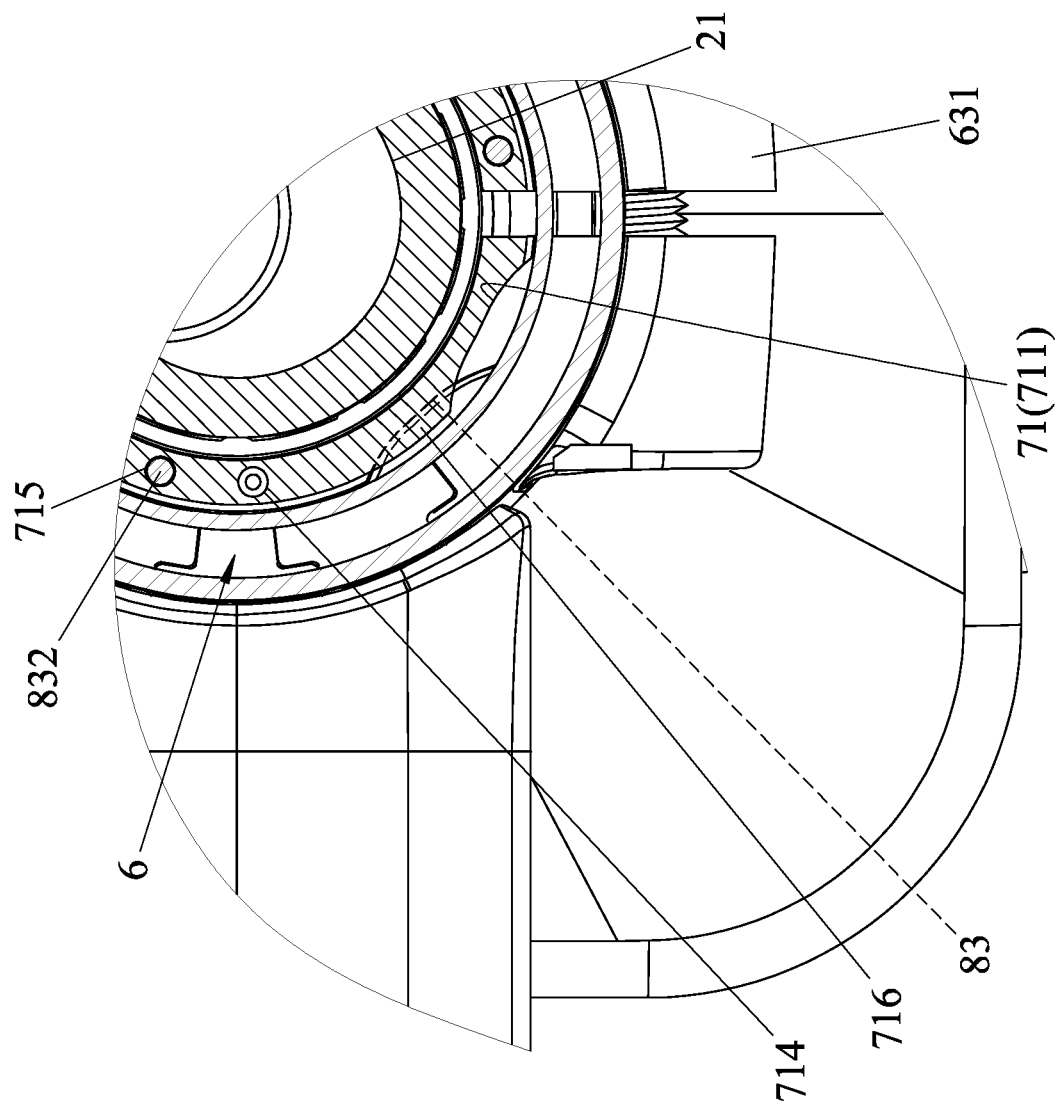

Referring to FIGS. 19 to 22, the surrounding cover 8 is turnable about the axis (X) relative to the cover positioning wall 7 between an unlocking position (as shown in FIGS. 19 and 20), where each retaining protrusion 83 is inserted in the corresponding leading slot segment 711 to permit axial movement of the surrounding cover 8 for removing the surrounding cover 8 from the adaptor module 6, and each positioned stud 832 is engaged in the corresponding first positioning hole 714, and a locking position (as shown in FIGS. 21 and 22), where each retaining protrusion 83 is retained in the corresponding trailing slot segment 712 by the retaining wall 716 to prevent the axial movement of the surrounding cover 8, and each positioned stud 832 is engaged in the corresponding second positioning hole 715. The engagement of the positioned studs 832 with the first and second positioning holes 714, 715 can indicate the unlocking and locking positions of the surrounding cover 8 to the user.

Figure 23:
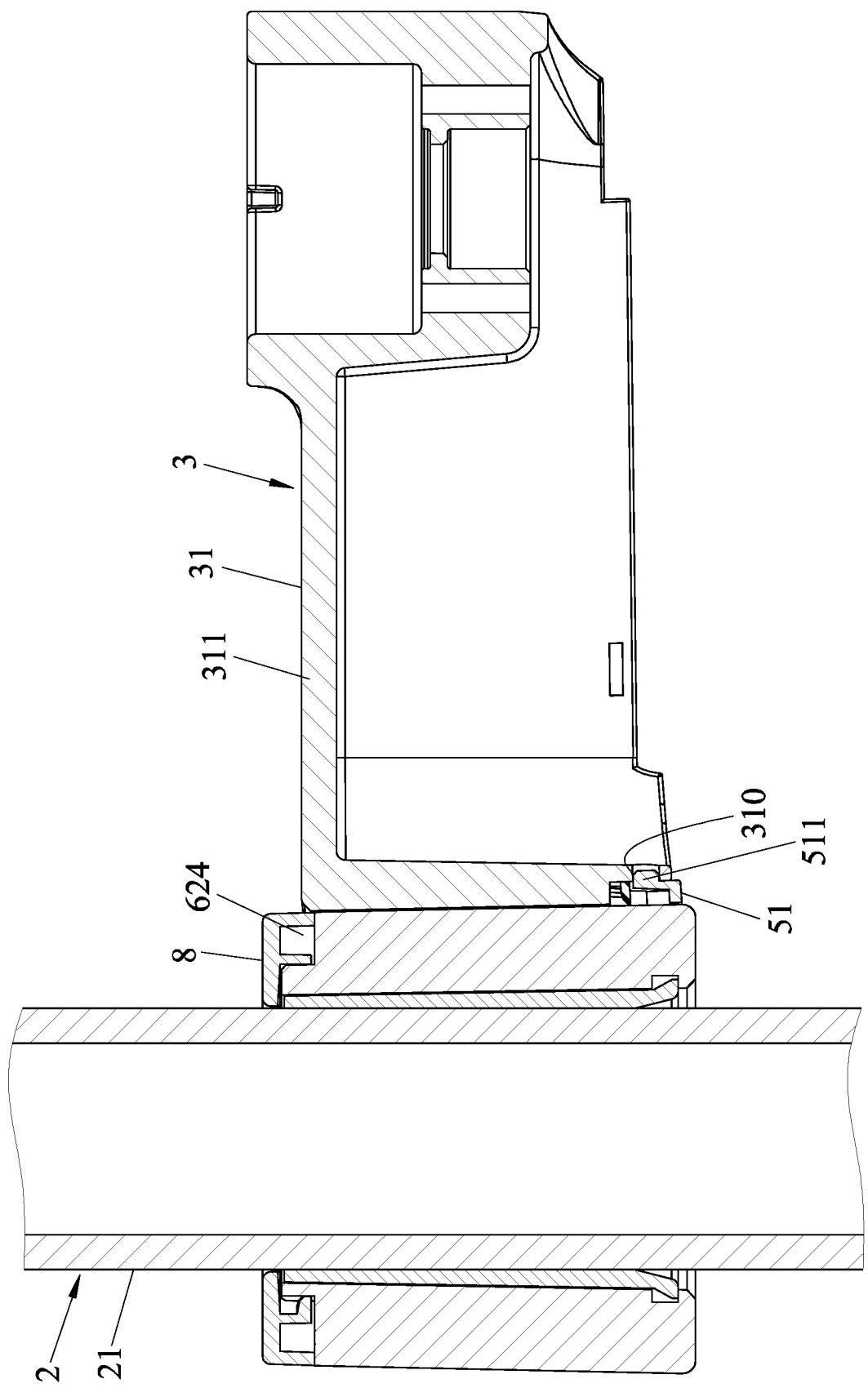
FIG. 23 is a fragmentary sectional view of the embodiment.

Referring to FIGS. 4 and 23, the elastomeric retaining enhancing member 5 is disposed between the anchoring portion 312 and the surrounding wall 61 to enhance the retaining connection of the extension arm 31 to the adaptor module 6. Specifically, the elastomeric retaining enhancing member 5 has an elastomeric body 51 which is attached to the surrounding wall 61 and which has a U-shaped split 52 formed therethrough to define a tongue 511 that is elastically bent to engage the abutment hole 310 in the end wall 317 of the extension arm 31. The elastomeric body 51 is made of an elastomeric plastic material, and is disposed to enhance the retaining of the extension arm 31 to the adaptor module 6.

As illustrated, with the anchored portions 62 of the adaptor module 6 and the corresponding anchoring members 313 of the extension arm 31 slidable along and engaged with the anchored portions 62 in the axial direction, the extension arm 31 is removably connected to the adaptor module 6 to adjust the angular position thereof to the upright post 21 without the need to remove the adaptor module 6 from the upright post 21.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An extension arm support device comprising:
   a support unit including an upright post which extends along an axis;
   an adapting unit including an adaptor module which is sleeved around said upright post, said adaptor module having a surrounding wall which surrounds said upright post, and a plurality of anchored portions which are disposed on said surrounding wall and angularly displaced from each other about the axis, each of said anchored portions having at least one anchored rail which extends in an axial direction parallel to the axis; and
   an extension arm unit including at least one extension arm which extends in a lengthwise direction radial to the axis to terminate at an anchoring portion, said anchoring portion having an end wall which faces said anchored portions, and at least one anchoring member which is disposed on said end wall and which is slidable along and engaged with said anchored rail in the axial direction such that said extension arm is removably connected to said adaptor module.

2. The extension arm support device as claimed in claim 1, wherein said anchored rail is in form of a groove which is formed in said surrounding wall, said anchoring member being in form of a protrusion which projects from said end wall, said anchored rail having a larger width groove portion and a smaller width groove portion which are formed proximate to and distal from the axis, respectively, and which are in spatial communication with each other, said smaller width groove portion having in the axial direction a length which is smaller than that of said larger width groove portion such that said anchoring member is slidably inserted in said anchored rail in the axial direction and is restricted from radial movement relative to the axis.

3. The extension arm support device as claimed in claim 2, wherein said anchored rail extends in the axial direction to terminate at an upper opening which is in spatial communication with said larger and smaller width groove portions for insertion and removal of said anchoring member into and from said anchored rail.

4. The extension arm support device as claimed in claim 1, wherein said anchored rail is in form of a groove which is formed in said surrounding wall, said anchoring member being in form of a protrusion which projects from said end wall and which is slidably inserted in said groove in the axial direction to have an upper surface immerged in said groove.

5. The extension arm support device as claimed in claim 1, wherein said adapting unit further includes a cover positioning wall which is disposed inwardly and radially of said surrounding wall to surround said upright post and which projects upwardly from said surrounding wall, said cover positioning wall having at least one retaining slot which is formed in an outer surface thereof and which extends circumferentially to have leading and trailing slot segments that are angularly displaced from each other, and a retaining wall which is formed above said trailing slot segment, said adapting unit further including a surrounding cover which is sleeved around said upright post to cover said anchored rails of said anchored portions and which has at least one retaining protrusion projecting radially and inwardly toward the axis such that said surrounding cover is turnable about the axis relative to said cover positioning wall between an unlocking position, where said retaining protrusion is inserted in said leading slot segment to permit axial movement of said surrounding cover, and a locking position, where said retaining protrusion is retained in said trailing slot segment by said retaining wall to prevent the axial movement of said surrounding cover.

6. The extension arm support device as claimed in claim 5, wherein said cover positioning wall has at least one first positioning hole and at least one second positioning hole which are formed in an upper end surface thereof and angularly displaced from each other about the axis, said surrounding cover having a positioned stud which projects from a lower end surface thereof and which is engaged in one of said first and second positioning holes when said surrounding cover is in a corresponding one of the locking and unlocking positions.

7. The extension arm support device as claimed in claim 1, further comprising at least one elastomeric retaining enhancing member which is disposed between said anchoring portion and said surrounding wall to enhance the retaining connection of said extension arm to said adaptor module.

8. The extension arm support device as claimed in claim 7, wherein said elastomeric retaining enhancing member has an elastomeric body which is attached to said surrounding wall and which has a U-shaped split formed therethrough to define a tongue that is elastically bent to engage said anchored portion of said extension arm.

9. The extension arm support device as claimed in claim 1, wherein said surrounding wall of said adaptor module is of a C-shape, and extends circumferentially to terminate at two edges, said surrounding wall having two lugs which are respectively formed adjacent to said two edges, and a quick-release fastener which extends through said lugs to tighten said lugs close to each other.

10. The extension arm support device as claimed in claim 1, wherein said adaptor unit further includes a collar which is interposed between said surrounding wall and said upright post to increase friction therebetween so as to prevent axial movement and rotation of said surrounding wall relative to said upright post.

* * * * *